(12) United States Patent
Good et al.

(10) Patent No.: US 9,515,548 B2
(45) Date of Patent: Dec. 6, 2016

(54) CHARGE PUMP SYSTEMS AND METHODS (71) Applicant: Wispry, Inc., Irvine, CA (US)

(72) Inventors: Peter Good, Dana Point, CA (US); Arthur S. Morris, III, Raleigh, NC (US)

(73) Assignee: WISPRY, INC., Irvine, CA (US)

( * ) Notice: Subject to any disclaimer, the term of this patent is extended or adjusted under 35 U.S.C. 154(b) by 0 days.

(21) Appl. No.: 14/216,388

(22) Filed: Mar. 17, 2014

(65) Prior Publication Data

US 2014/0285254 A1 Sep. 25, 2014

Related U.S. Application Data (60) Provisional application No. 61/794,268, filed on Mar. 15, 2013.

(51) Int. Cl.
*G05F 1/10* (2006.01)
*H02M 3/07* (2006.01)

(52) U.S. Cl.
CPC ...................... *H02M 3/07* (2013.01)

(58) Field of Classification Search
CPC .. H02M 3/07; H02M 3/073; H02M 2003/077; G11C 5/145
See application file for complete search history.

(56) References Cited

U.S. PATENT DOCUMENTS

| | | | |
|---|---|---|---|
| 5,043,858 A | 8/1991 | Watanabe | |
| 6,411,157 B1 * | 6/2002 | Hsu et al. | 327/536 |
| RE41,217 E * | 4/2010 | Ganesan et al. | 363/60 |
| 2002/0101744 A1 * | 8/2002 | DeMone | 363/59 |
| 2006/0176525 A1 * | 8/2006 | Mizuta et al. | 358/474 |
| 2007/0242026 A1 * | 10/2007 | Julian et al. | 345/100 |
| 2009/0167418 A1 * | 7/2009 | Raghavan | H02M 3/073 327/536 |
| 2010/0117719 A1 * | 5/2010 | Matano | H02M 3/073 327/536 |
| 2011/0133819 A1 * | 6/2011 | Cook et al. | 327/536 |
| 2012/0256602 A1 | 10/2012 | Buiatti et al. | |

FOREIGN PATENT DOCUMENTS

| | | |
|---|---|---|
| JP | 2001/309641 | 11/2001 |
| JP | 2007/267539 | 10/2007 |
| KR | 10-2012-0055354 | 5/2012 |
| WO | WO 2014/145641 | 9/2014 |

OTHER PUBLICATIONS

International Search Report for Application No. PCT/US2014030441 dated Sep. 4, 2014.
Notice of Publication for European Application No. 14762593 dated Dec. 23, 2015.

* cited by examiner

*Primary Examiner* — Sibin Chen
(74) *Attorney, Agent, or Firm* — Jenkins, Wilson, Taylor & Hunt, P.A.

(57) ABSTRACT

Charge pump systems and methods for the operation thereof can be configured for delivering charge to a primary circuit node. A sequential charging pattern of at least a subset of a series-connected plurality of charge-pump stages connected between a supply voltage node and the primary circuit node can be selectively initiated. For example, the sequential charging pattern can be initiated one time for every N cycles of a given clock signal, wherein N is a selectively adjustable integer value greater than or equal to 1.

23 Claims, 11 Drawing Sheets

CHARGE PUMP SYSTEMS AND METHODS

PRIORITY CLAIM

The present application claims the benefit of U.S. Provisional Patent Application Ser. No. 61/794,268, filed Mar. 15, 2013, the disclosure of which is incorporated herein by reference in its entirety.

TECHNICAL FIELD

The subject matter disclosed herein relates generally to configurations and operation of voltage multipliers. More particularly, the subject matter disclosed herein relates to configurations and operation of charge pumps used to charge a capacitor to a relatively higher potential than a voltage supply.

BACKGROUND

Charge pumps are used to generate a desired high voltage output in configurations where the supply voltage is comparatively low. Specifically, for example, a charge pump can be used to actuate high value MEMs capacitive switches for use in an antenna tuner. In such configurations, even though the charge pump is electrically isolated from low amplitude radio frequency (RF) signals communicated by such an antenna tuner, high order harmonics of the charge pump can couple into the RF path and degrade the signal-to-noise ratio for low power RF signals in receive mode. Specifically, for example, current spikes in the pump supply (Vdd), ground lines, and the substrate can generate parasitics, leakage, and noise on the supply lines and substrate that can couple to sensitive circuits. To address such issues, best practice isolation can help, but it is also important to minimize the size of harmonics at their source.

SUMMARY

In accordance with this disclosure, charge pump systems and methods for the operation thereof are provided. In one aspect, a method for delivering charge to a primary circuit node is provided. The method can comprise initiating a sequential charging pattern of at least a subset of a series-connected plurality of charge-pump stages connected between a supply voltage node and the primary circuit node. The sequential charging pattern can be initiated one time for every N cycles of a given clock signal, wherein N is an adjustable integer value selected from a range of values greater than or equal to one.

In another aspect, a configuration for a charge pump is provided. The charge pump can comprise a pattern generation device in communication with a clock signal generator, at least one charging signal generator in communication with the pattern generation device, and a series-connected plurality of charge-pump stages connected between a supply voltage node and a primary circuit node. The pattern generation device can be configured to generate a patterned clock signal based on a two-phase clock signal supplied by the clock signal generator, and the patterned clock signal can comprise a selectively adjustable subset of cycles of the two-phase clock signal. Each of the plurality of charge-pump stages can be connected in communication with the at least one charging signal generator, wherein the at least one charging signal generator is configured to selectively drive charge through at least a subset of the plurality of charge-pump stages in a sequential charging pattern.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter is directed to charge pump systems and methods that lower the current spikes in the supply and ground lines of a charge pump while still maintaining the same value of high voltage output. A standard Dickson-type charge pump uses multiple stages of capacitors linked by a diode string. Charge is passed between the capacitors through the diode string by a two-phase clock such it can only flow one way and the charge builds up in a hold capacitor at the end of the string. The number of stages can be selected to generate the amount of voltage step-up desired from the charge pump. For instance, the number of stages can be selected based on the difference between the desired high voltage output and the charge pump's voltage supply Vdd. The number of stages is thereby generally fixed for any given application.

Figure 1A:
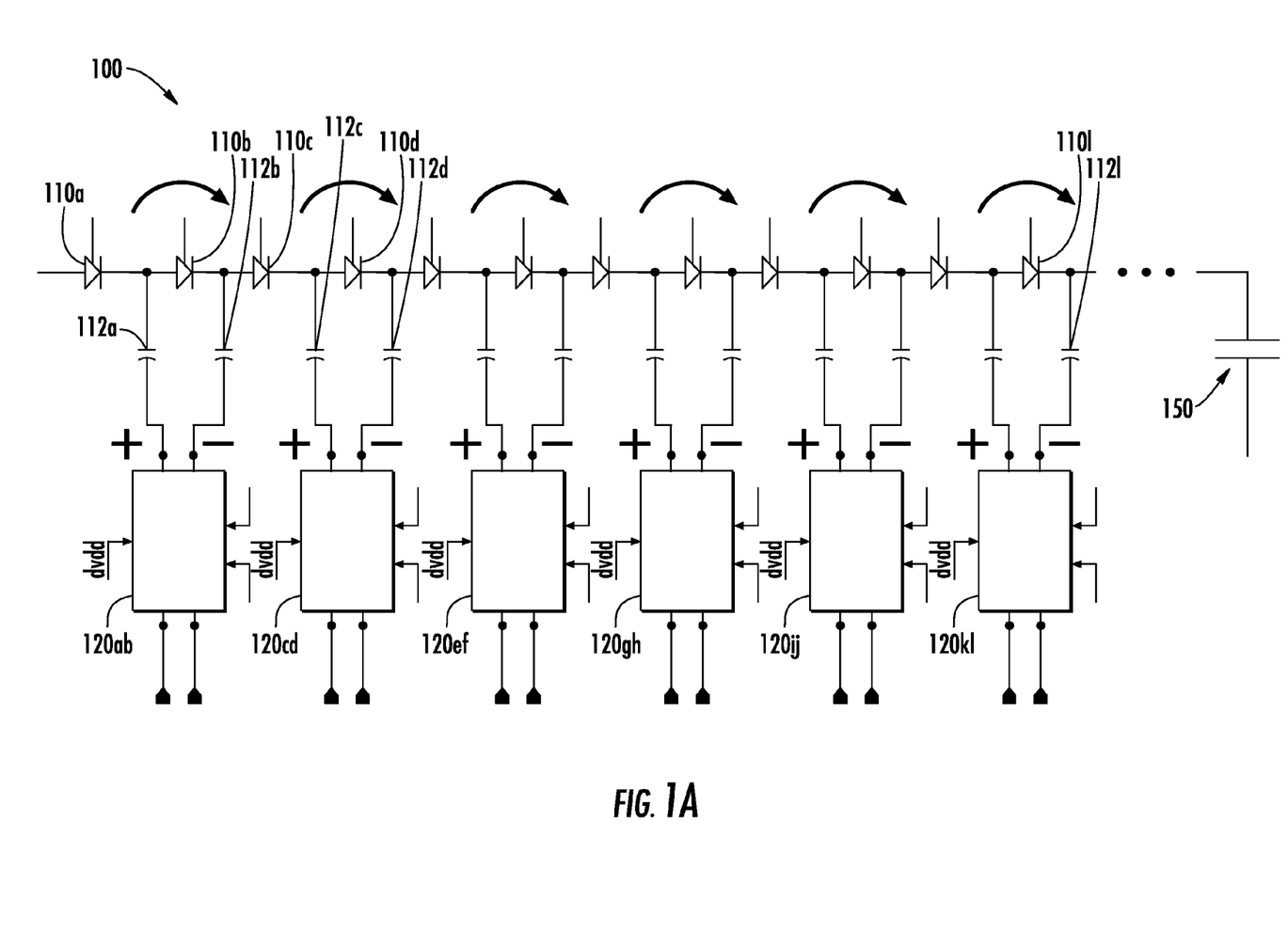
FIGS. 1A and 1B are schematic representations of a charge pump in an exemplary operating mode according to an embodiment of the presently disclosed subject matter.
Figure 1B:
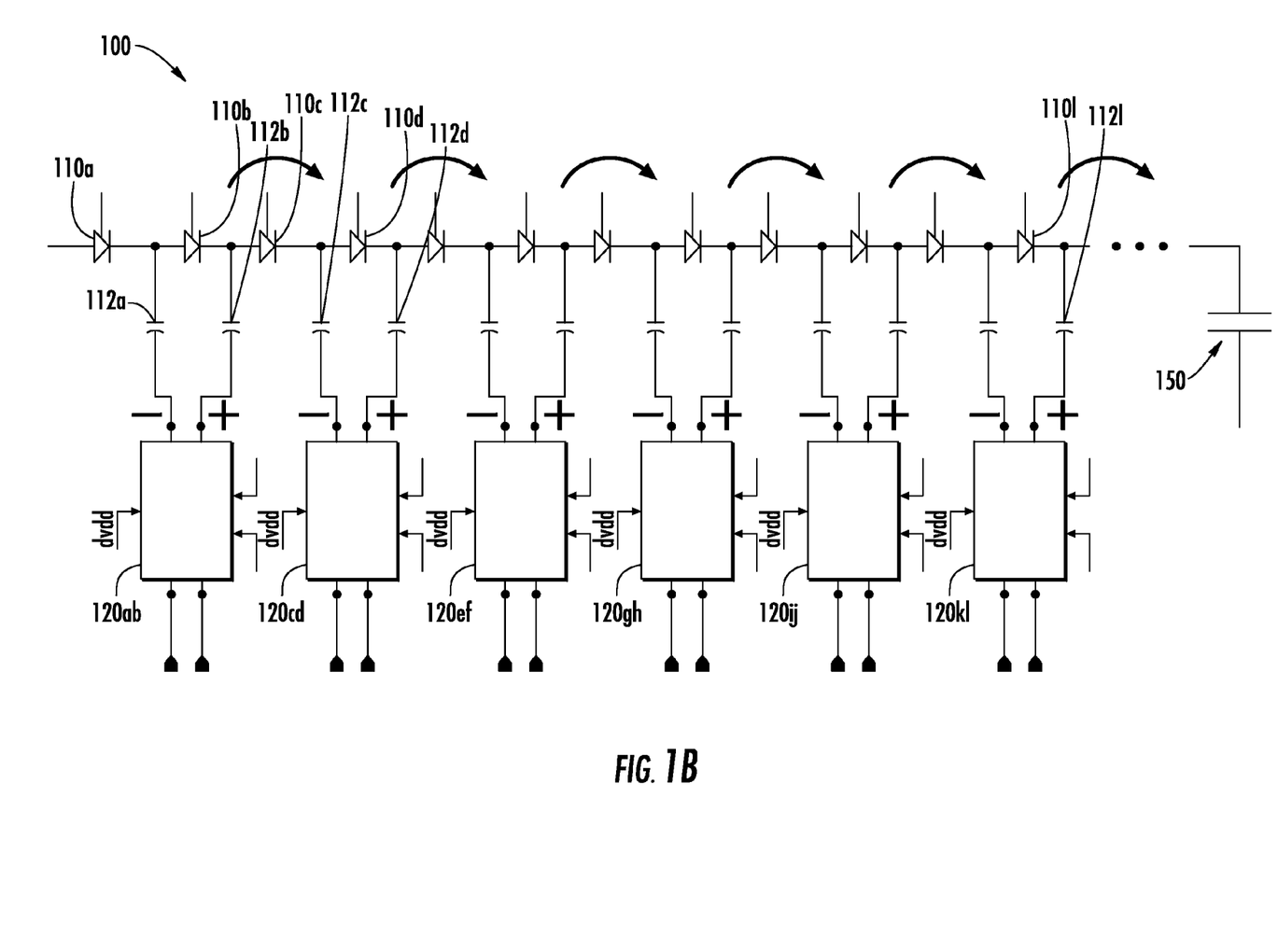

For example, one configuration for a charge pump design can include an even number of stages, half of which are clocked high on each rising clock edge and the other half are clocked high on the falling clock edge. As illustrated in FIGS. 1A and 1B, for example, an exemplary configuration for a charge pump, generally designated 100, can have a plurality of diodes 110a through 110l connected in a series arrangement between a supply voltage node and a primary circuit node. To drive charge across the diode chain, a plurality of pump stage capacitors 112a through 112l are each connected to a cathode terminal of a corresponding one of diodes 110a through 110l to form each charge pump stage, and plurality of drivers 120ab, 120cd, 120ef, 120gh, 120ij, and 120kl control the charging of pump stage capacitors 112a through 112l (i.e., driver 120ab is coupled to pump stage capacitors 112a and 112b, etc.).

The following disclosure makes reference to charge pump 100 containing these twelve charge pump stages shown (i.e., combination of diodes 110a-110l and pump stage capacitors 112a-112l), but those having skill in the art will recognize that the subject matter disclosed herein can be broadly applied to configurations of charge pump 100 having any number of pump stages (i.e., a greater or lesser number of diodes and/or pump stage capacitors). Regardless of the particular number of pump stages, a hold capacitor 150 can be connected to the primary circuit node such that the operation of charge pump 100 charges hold capacitor 150 to the desired high voltage output.

In the operating mode illustrated in FIGS. 1A and 1B, charge is driven across every other stage of charge pump 100, which generates current spikes in voltage supply Vdd, in the ground lines, and in the substrate. In addition, those having skill in the art will recognize that noise on the supply lines and substrate can couple to sensitive circuits. Accordingly, minimizing the amount of switching activity is desirable, but the number of stages cannot be lowered while achieving the same voltage step-up from voltage supply Vdd to the desired high voltage output. Similarly, changing the clock frequency does not provide a solution, as on each clock edge there is the same activity regardless of the clock period. All that changes is the frequency distribution of the clock harmonics, not their amplitude (excepting any spectral shaping of the harmonics since higher harmonics are more likely to be lower in amplitude due to finite bandwidth). Furthermore, changing the size of pump stage capacitors 112a through 112l could achieve a reduction in current and consequent increase in output resistance, but doing so can prevent charge pump from achieving the same charging rate that is possible with conventional designs.

As a result, the systems and methods described herein allow the operator to modify the way in which the clocks are generated for charge pump 100 so that instead of all stages clocking continuously, the operation of charge pump 100 can be selectively changed such that only a sub-set of stages are clocked at any one time. Specifically, for a given clock signal (e.g., an overlapping or non-overlapping clock signal), a patterned clock signal can be generated, this patterned clock signal comprising a selectively adjustable subset of cycles of the given clock signal. The patterned clock signal can be transmitted to at least one charging signal generator connected in communication with the each of the plurality of charge-pump stages, which can thereby initiate the sequential charging pattern of the plurality of charge-pump stages according to the patterned clock signal. In other words, an operator can selectively adjust an input value N, wherein for every N cycles of a given clock signal (e.g., every two pulses of a two-phase clock signal), a sequential charging pattern is initiated in charge pump 100. Even with this modification to the operation of charge pump 100, however, the clock phases can still be arranged such that the charge is passed along the chain of diodes 110a through 110l in a rippling fashion. That is, charge can be repeatedly driven through a next sequential charge-pump stage (e.g., an adjacent one of the series-connected plurality of charge-pump stages that is connected relatively closer to the primary circuit node) through the entirety of charge pump 100.

For example, where k is equal to the number of charge pump stages, N can be selected to be divisible into the number k of charge-pump stages, wherein the sequential charging pattern can propagate evenly through charge pump 100. Alternatively, N can be selected such that it is not divisible into the number k of charge-pump stages. In such a configuration, the sequential charging pattern can either be terminated partway through the charge pump, or the sequential charging pattern can be initiated a number of times such that it ends on a last of the charge-pump stages. Furthermore, the sequential charging pattern can be initiated at a first of the series-connected plurality of charge-pump stages (e.g., by charging a first pump stage capacitor 112a) that is connected closest to the supply voltage node, or it can be initiated at any of the series-connected plurality of charge-pump stages connected between the supply voltage node and the primary circuit node.

In any operating mode, charge pump 100 can still be configured to allow the charge to propagate consecutively through each charge pump stage, but for increasing values of N, the "ripples" can be controlled to be initiated with a selected frequency.

For instance, FIGS. 1A and 1B illustrate a first limiting case in which charge pump 100 is operated in a substantially conventional operating mode in which every other one of pump stage capacitors 112a through 112l are charged during a given clock cycle. In other words, the value of N is equal to one such that with every cycle of the clock signal (i.e., every two pulses of the two-phase clock), the sequential charging pattern is initiated. In this way, each of pump stage capacitors 112a through 112l are alternatingly charged and discharged with every clock pulse to drive charge through charge pump 100. Although operating charge pump 100 in this setting introduces the same issues of current spikes, noise, and the like, which are associated with conventional Dickson-type charge pumps, this operation can be desirable to achieve the desired high voltage output over a minimum number of clock cycles (e.g., to charge hold capacitor 150 rapidly).

Where rapid charging at the primary circuit node is not necessary, however, the operation of charge pump 100 can be selectively adjusted to diminish the deleterious effects associated with conventional charge pump operation. In particular, the value of N can be increased to values greater than 1 to slow the initiation rate of the sequential charging pattern. In such configurations, pump stage capacitors 112a through 112l are still charged and discharged in sequence to drive charge across diodes 110a through 110l from the supply voltage node to the primary circuit node. In contrast to conventional operating modes, however, because this sequential charging pattern is only initiated once every N clock cycles, the "ripples" of charge that propagate through charge pump 100 are more spaced apart than during a substantially continuous, N=1 operating mode. As a result, the initiation rate of the sequential charging pattern is changed, but the propagation rate of charge through the sequential stages of charge pump 100 is not changed.

In this way, the number of pump stages that are actively driven at one time is reduced. As a result, current spikes at voltage supply Vdd and ground noise due to the operation of charge pump 100 can be reduced to C/k of that generated by conventional charge designs, where C is equal to the number of clock pulses per clock cycle (e.g., two pulses for a two-phase clock), and k is equal to the number of charge pump stages). Specifically, in a configuration having 24 pump stages driven by a two-phase clock, for example, the noise generated can be reduced to about 1/12 of "full-speed" operation, which can be about a 20 dB reduction. This change can represent a significant reduction in spurious levels.

Figure 2A:
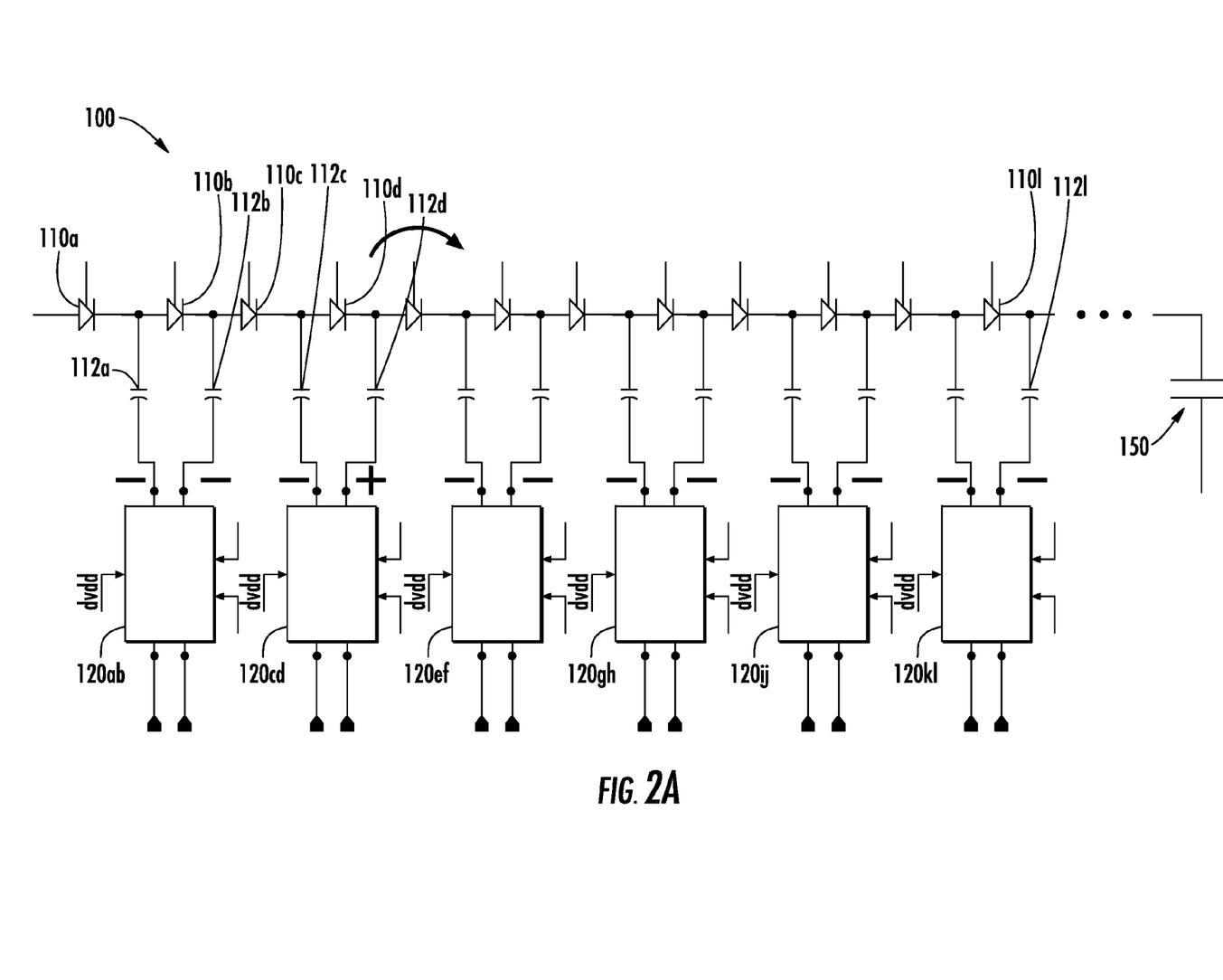
FIG. 2A is a schematic representation of a charge pump in an exemplary operating mode according to an embodiment of the presently disclosed subject matter.
Figure 2B:
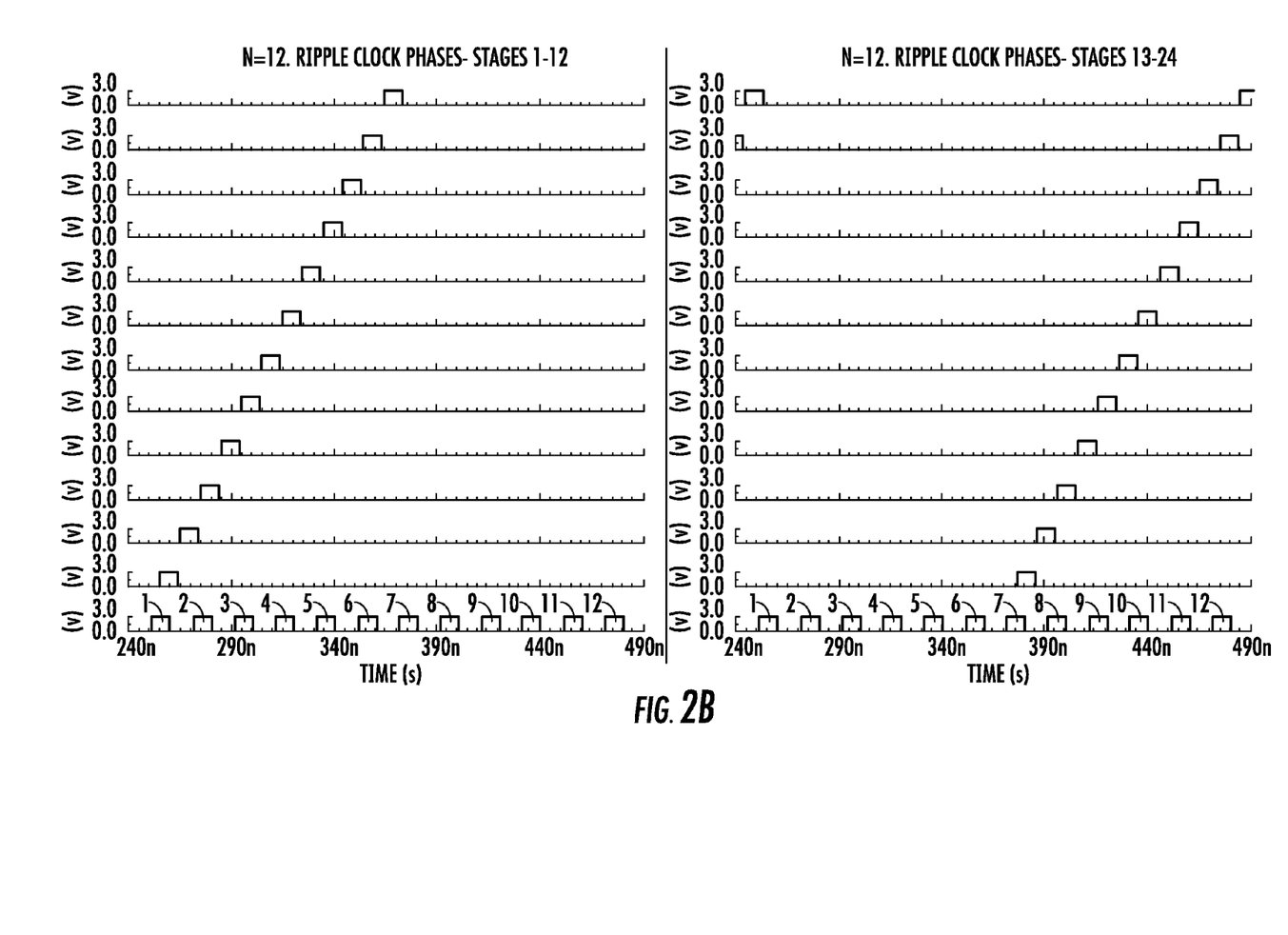
FIG. 2B is a graphical representation of an intermittent initiation of a sequential charging pattern of the charge pump according to the exemplary operating mode shown in FIG. 2A.

In one particular example shown in FIG. 2A, charge pump 100 can be operated such that only one stage is clocking at any time. In this operating mode, the amplitude of the current spike from voltage supply Vdd is reduced to C/k of the existing charge pump design. As shown in FIG. 2B, for example, where charge pump 100 includes 24 pump stages driven by a two-phase clock, charge is passed across only a single pump stage at any one time when N is set to a value of 12. These "softer", smaller spikes spread the leakage and noise generated over a longer time period (i.e., lower noise density) such that although the aggregate is the same over a full charge of hold capacitor 150, there is less noise at any given time. As a result, the real-time effect of charge pump 100 on surrounding systems is lessened.

Figure 3A:
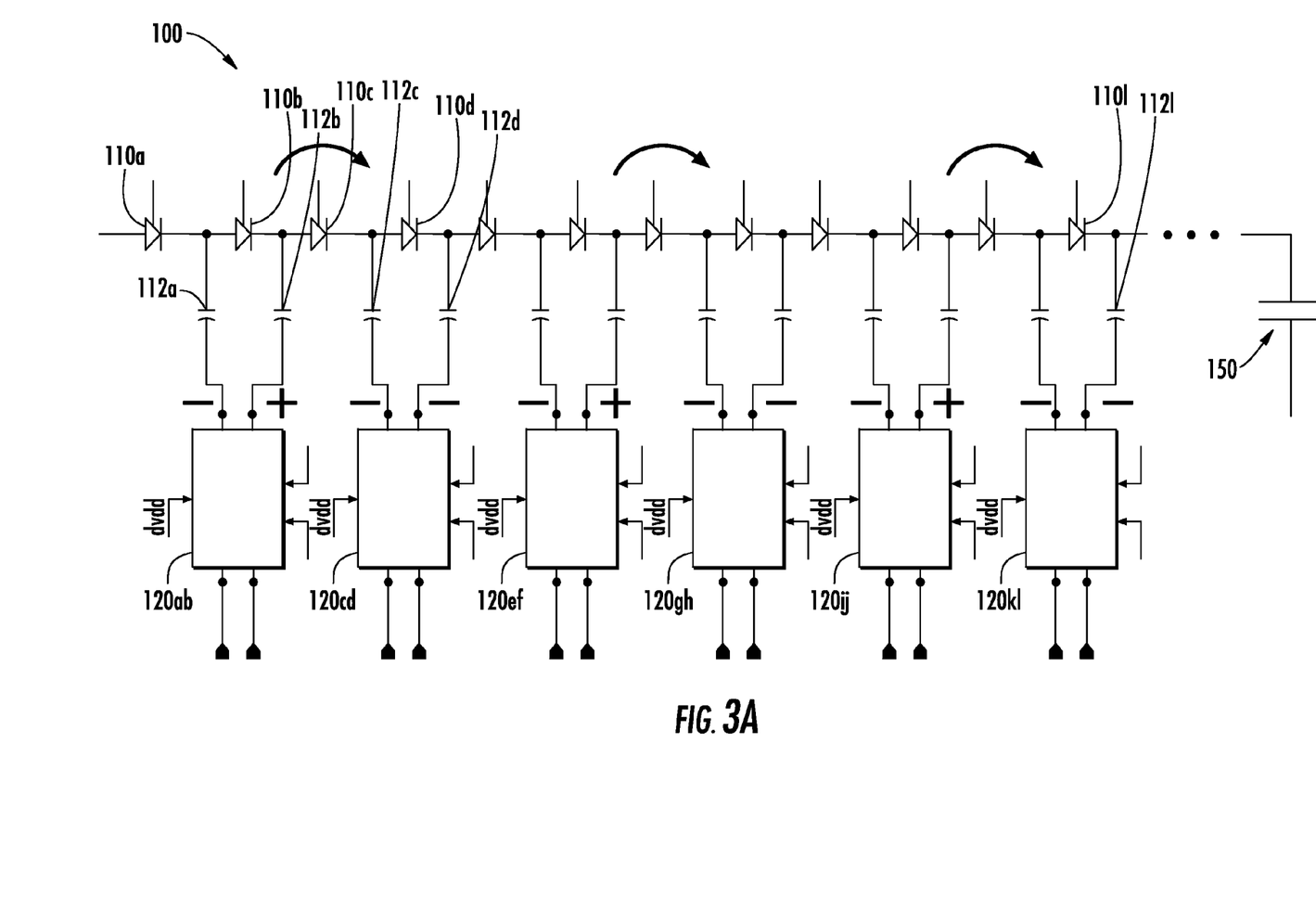
FIG. 3A is a schematic representation of a charge pump in an exemplary operating mode according to an embodiment of the presently disclosed subject matter.
Figure 3B:
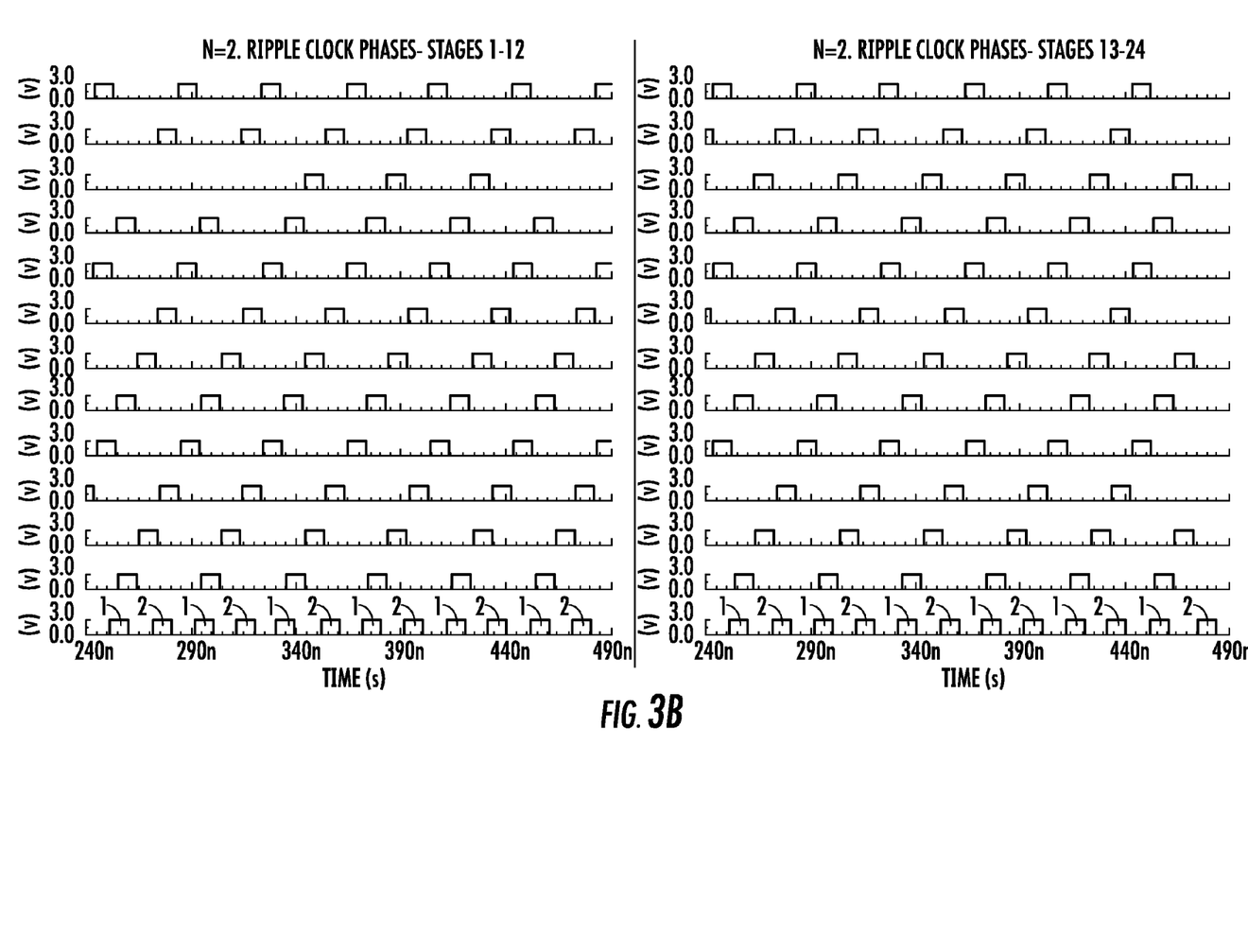
FIG. 3B is a graphical representation of an intermittent initiation of a sequential charging pattern of the charge pump according to the exemplary operating mode shown in FIG. 3A.

In another particular example, FIGS. 3A and 3B illustrate an operating mode of charge pump 100 in which N=2, whereby the sequential charging pattern is initiated every two clock cycles. This operating mode generates half the noise of N=1 operation. Similarly, if the counter were set to N=6 for a 24-stage configuration of charge pump 100, for example, after the first pulse had "rippled" half-way down the string of diodes 110a through 110l, a new pulse would start propagating down the string, and thus only two pump stages would be "active" on each edge of the main clock. Further in this regard, those having skill in the art will recognize that the value of N can be selectively adjusted to be any number greater than or equal to one to control the frequency at which the sequential charging pattern is initiated in charge pump 100.

Figure 4:
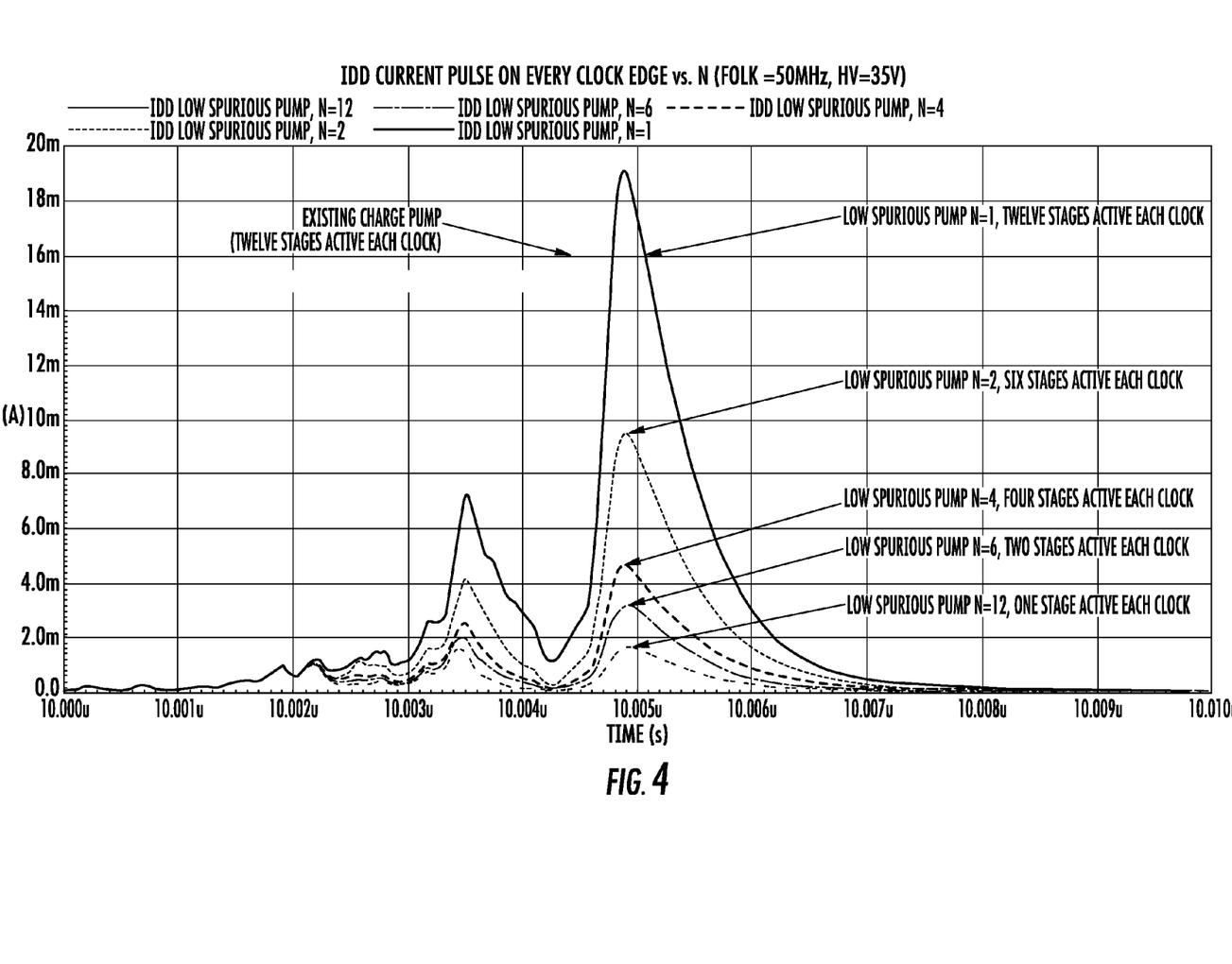
FIG. 4 is a graph of noise generated over time by a charge pump operated according to a variety of exemplary operating modes according to embodiments of the presently disclosed subject matter.
Figure 5:
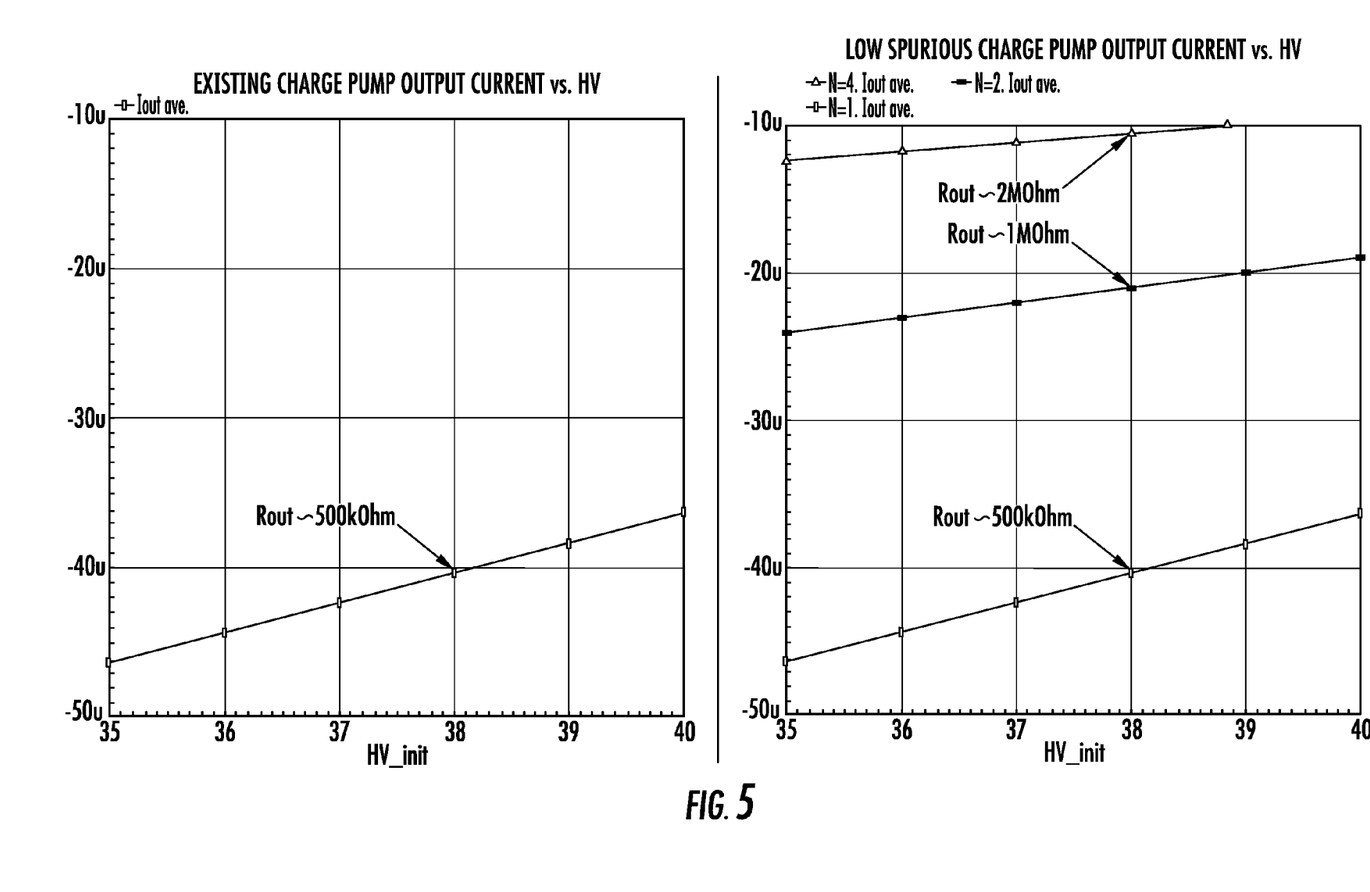
FIG. 5 is a graph of charge pump output according to a variety of exemplary operating modes according to embodiments of the presently disclosed subject matter.
Figure 6:
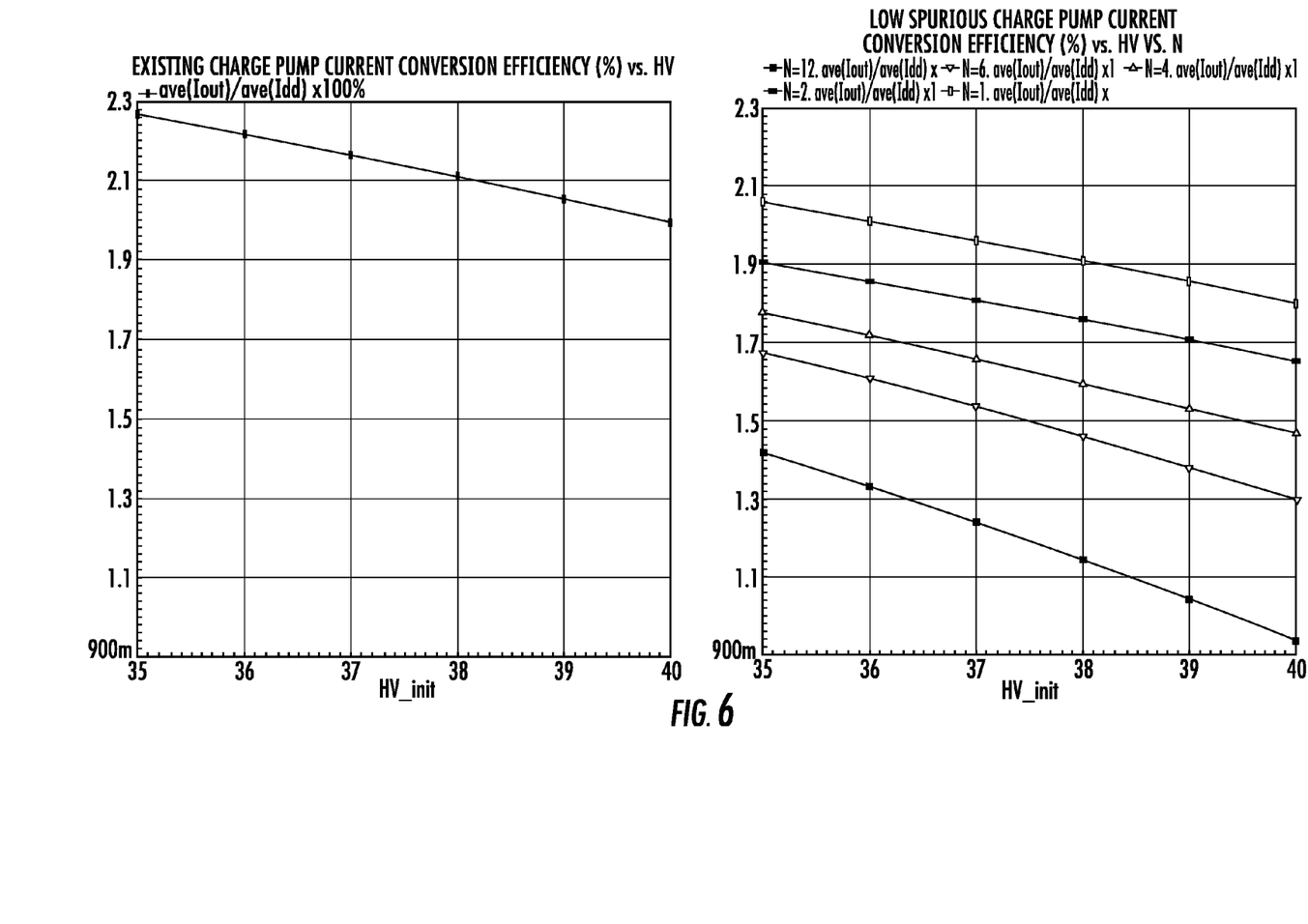
FIG. 6 is a graph of charge pump current conversion efficiency according to a variety of exemplary operating modes according to embodiments of the presently disclosed subject matter.

In this way, where load is relatively light (i.e., the current draw from the primary circuit node is low and/or infrequent), the value of N can be increased to spread the detrimental effect of operating charge pump 100 on surrounding systems over time. For instance, as shown in FIG. 4, the range of current pulses generated in a 24-stage charge pump is illustrated for a sample of possible values of N, FIG. 5 illustrates a simulated reduction in output current for a given high voltage output at settings of N=2 and N=4, and FIG. 6 illustrates a simulated reduction in current conversion efficiency for a given high voltage output at settings of N=2, N=4, N=6, and N=12.

One potential downside to reducing the number of stages that are "active" on any clock edge is that the output resistance of charge pump 100 increases proportionally. This increase slows pump charging time (i.e., for the same value of a desired high voltage output hold capacitance, which is fixed in proportion to the total switching capacitance load seen by the charge pump for the electrostatic actuators). To overcome this increased charging time, the operation of charge pump 100 can be set for N=1 to clock every other stage and give the normal, comparatively quicker ramp-up time. Once the desired high voltage output regulation is achieved, however, charge pump 100 can be controlled to operate at a relatively lower noise mode (i.e., N>1) to maintain the desired high voltage output and/or to recover from minor voltage discharges (e.g., partial discharge of hold capacitor 150). Similarly, the activity level can be selectively increased concurrently with or following a large current drain (e.g., complete or near-complete discharge of hold capacitor 150) to more quickly recover to the desired high voltage output at the primary circuit node.

In addition, as noted above, increased output resistance can slow the rise time, which can degrade the high voltage output regulation duty cycle. The reduction in average pump current can offset the duty cycle, however, and no significant increase in pump average supply current will result. Similarly, lowering the clock frequency degrades rise time and high voltage output regulation duty cycle but also reduces pump ON current. Measurements show that average pump current in regulation is mostly independent of clock frequency (i.e., output resistance).

Alternatively or in addition, charge pump 100 could be controlled in a manner in which not all stages are driven. Specifically, for example, charge pump 100 can be controlled such that more stages (e.g., the entire string of diodes) are used for large steps in voltage, but fewer stages (e.g., a subset of the charge pump stages containing one-half to two-thirds of the total number of stages) need be operated to hold the primary circuit node at the desired high voltage output. In addition, this difference in operating modes can be exaggerated by operating the greater number of stages at a high clock frequency and operating the reduced number of stages at a low clock frequency. In this way, only a portion of the stages of charge pump 100 need be driven, and the remaining un-driven stages are configured to allow the charge to "float" up through the remainder of charge pump 100 to the primary circuit node (e.g., to charge hold capacitor 150).

Figure 7:
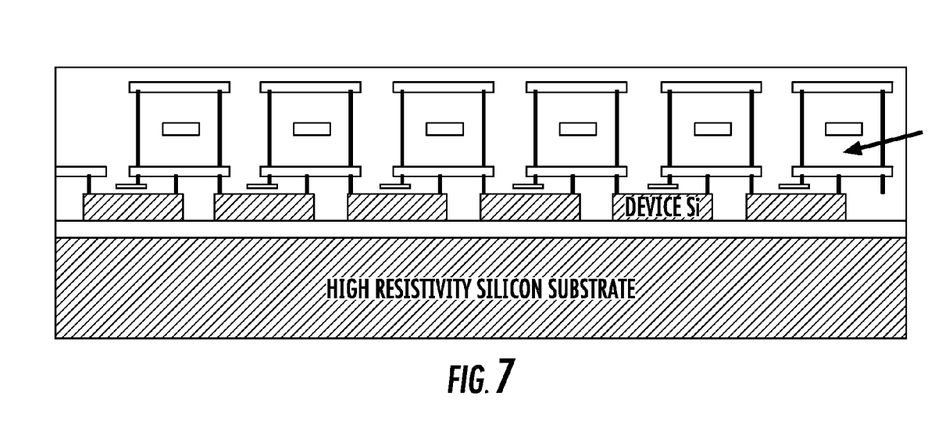
FIG. 7 is a side view of a charge pump according to an embodiment of the presently disclosed subject matter.

One possible configuration for charge pump 100 is shown in FIG. 7. In this configuration, charge pump 100 can constructed using silicon-on-insulator manufacturing methods since no high voltage switches are needed. With this configuration, the operation of charge pump 100 can be more efficient due to lower parasitics to ground compared to other technologies. In addition, this configuration can minimize the parasitic capacitances with minimum size transistors and not having the body tied to substrate, resulting in charge pump 100 being comparatively efficient and small with small value coupling capacitors, and control that is more complex can be enabled compared to simple diode-connected field-effect transistors (FETs). In addition, a large depletion region would not be required for substrate isolation.

Regardless of the particular implementation or configuration of charge pump 100, the selective control of the operation of charge pump 100 can be achieved using a system for generating a patterned clock signal based on a given clock signal (e.g., a two-phase clock signal). In one particular configuration shown in FIG. 8, for example, a charge pump control system, generally designated 200, can include at least one charging signal generator in communication with each of the plurality of charge-pump stages of charge pump 100. In the configuration shown in FIG. 8, for example, a combination of two shift registers 210a and 210b (i.e., one for each clock phase) is operable as the charging signal generator. Shift registers 210a and 210b can together comprise a number of output bits that is equal to a number of charge-pump stages.

Figure 8:
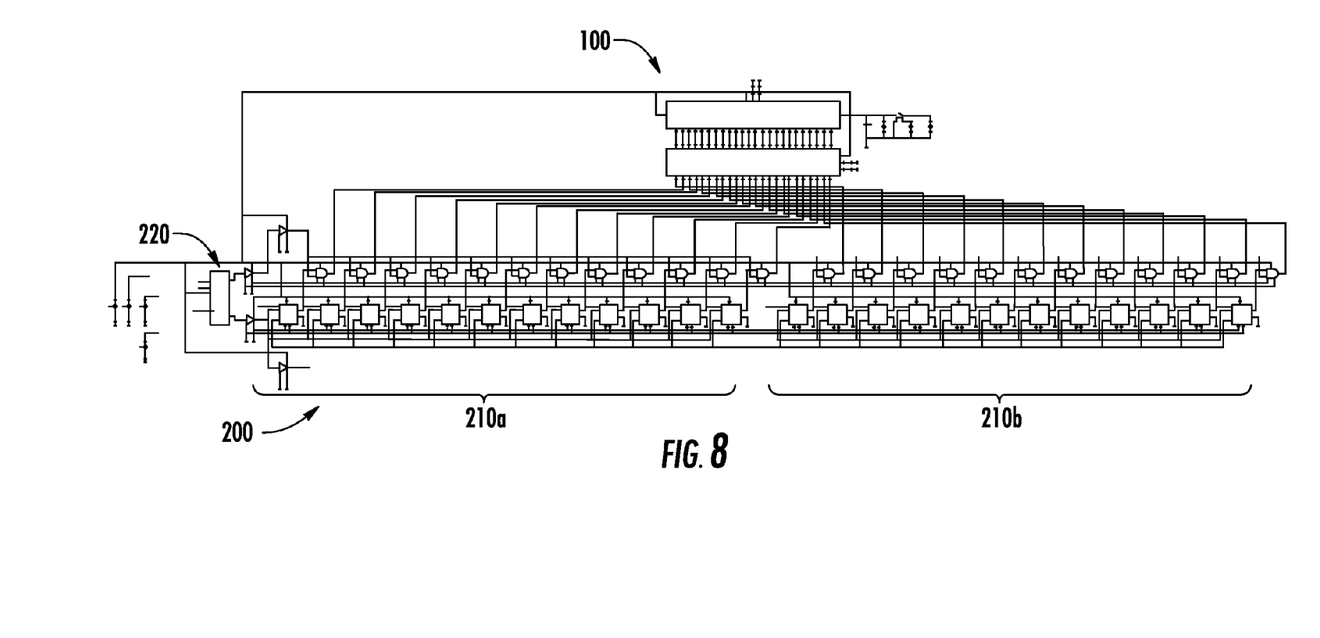
FIG. 8 is a schematic representation of a charge pump and charging signal generator according to an embodiment of the presently disclosed subject matter.

A pattern generation device 220 can be provided in communication with a clock signal generator (not shown) and the at least one charging signal generator (i.e., in communication with both of shift registers 210a and 210b). For example, pattern generation device 220 can comprise a programmable counter or a programmable divider of $2^p$. Specifically, in one particular exemplary implementation, pattern generation device 220 can comprise a decrementing programmable counter, wherein every time the decrementing programmable counter reaches zero, it initiates the sequential charging pattern of the plurality of charge-pump stages and resets to an initial value. In this configuration, changing the value of N can involve changing the initial value of the counter (i.e., changing the reset rate).

Regardless of the particular implementation, pattern generation device 220 can be configured to generate a patterned clock signal based on a clock signal supplied by the clock signal generator, the patterned clock signal containing a selected subset of cycles of the two-phase clock signal. In the case of clocking only one stage at a time, for example, pattern generation device 220 is set to N=k/2 (e.g., N=12 for a 24-stage configuration of charge pump 100), and the output pulse ripples down each of shift registers 210a and 210b to produce k individual clock pulses applied in series down the diode string of charge pump 100. Changing the initiation rate of the sequential charging pattern can be achieved by changing the setting of N at pattern generation device 220. This allows the amount of charge pump activity to be changed dynamically while still generating the desired value of the high voltage output.

Structurally, there can be an area overhead cost for the extra clocking circuitry, but this additional area requirement is not expected to be prohibitive, especially compared to the large area occupied by the diodes and capacitors of charge pump 100 itself. Similarly, there can also be a current overhead due to the additional use of shift registers, programmable dividers, and the like, compared to conventional charge pump configurations. These additional current uses can be expected to be similar to the current used in one stage of a charge pump. Accordingly, the additional operation constraints can be considered only marginally greater than those of conventional designs.

In addition to controlling the way in which the clocks are generated for charge pump 100, the present subject matter can further provide a regulation system for sensing the available high voltage output at the primary circuit node (e.g., the charge state of hold capacitor 150) to determine when charge pump 100 should be activated. In particular, for example, a sensor can be coupled to charge pump 100 to determine the voltage at the primary circuit node. In one configuration, for example, a voltage divider can be connected in parallel with the primary circuit node to identify when the desired high voltage output is achieved at the primary circuit node. This configuration can add a comparatively large amount of leakage to charge pump 100, which can require charge pump 100 to be operated more often to maintain the desired high voltage output at the primary circuit node.

Figure 9:
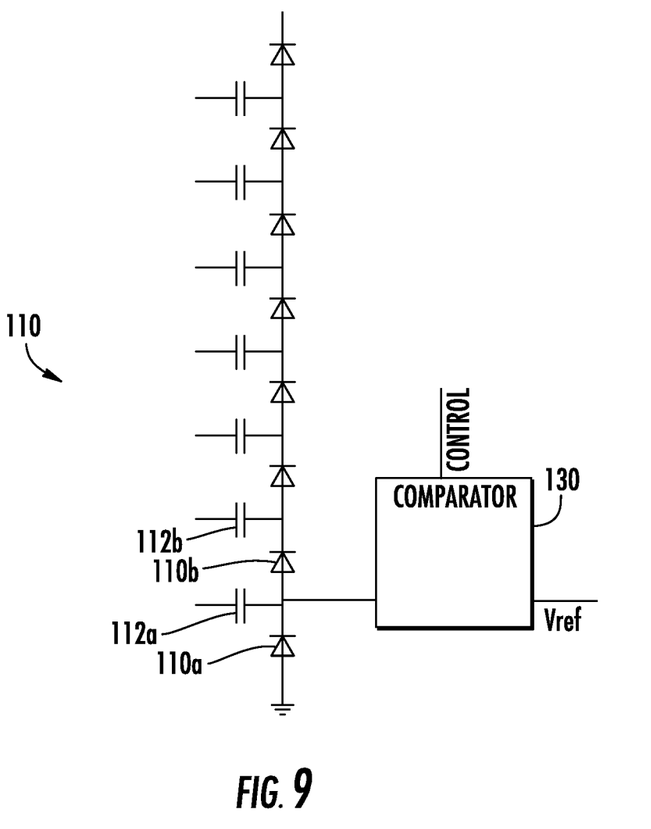
FIG. 9 is a schematic representation of a charge pump control system according to an embodiment of the presently disclosed subject matter.

Alternatively, charge pump 100 can itself function as its own sensor when it is inactive (i.e., not actively driving charge across the diode chain). As shown in FIG. 9, for example, a comparator 130 can be connected in-line with one of the pump stages of charge pump 100. In this configuration, comparator 130 can be configured to extrapolate the present voltage at the primary circuit node (e.g., the charge state of hold capacitor 150) from a voltage measurement taken at the one of the plurality of charge-pump stages.

In particular, for example, comparator 130 can be configured to evaluate the difference between the voltage at the connected charge pump stage and an expected reference voltage Vref corresponding to the desired high voltage output at the primary circuit node. For instance, measuring a voltage to ground near the bottom of the string of diodes 110a-110l can provide a low voltage that is in direct proportion to the high voltage at the top of the string. In this way, the current consumed by the sensor can be greatly reduced compared to a sensor coupled at the primary circuit node since no separate voltage divider is required, thereby resulting in less total noise.

Regardless of the particular implementation of a regulation system, charge pump 100 can be controlled to maintain the desired high voltage output at the primary circuit node. In one particular example, charge pump 100 can be turned on when the regulation system identifies that the charge at the primary circuit node falls below the desired high voltage output. Because various factors can result in the charge at the primary circuit node degrading over time (e.g., leakage through the connected sensor), a buffer can be established between the desired high voltage output and a threshold at which charge pump 100 is turned on so that charge pump 100 need not be operated continuously.

In addition, in configurations where the readings taken by the regulation system lag behind the operation of charge pump 100 (e.g., due to a time constant effect of a voltage divider configuration of the sensor), the operation of charge pump 100 can overshoot the desired high voltage output at the primary circuit node before the regulation system can turn charge pump 100 off. Operating charge pump 100 at a lower frequency (e.g., at higher values of N) as discussed above, the effect of this overshoot can be minimized since the comparatively slower charging allows the regulation system to keep up with the changing voltage at the primary circuit node.

In an alternative configuration, rather than being a direct feedback loop, the regulation system can be configured to trigger the operation of charge pump 100 for a predetermined or calculated number of clock cycles through which charge pump 100 will be run. The number of cycles can be determined by one or more of the design of charge pump 100 (e.g., size of pump stage capacitors 112a-112l and/or total number of stages), the value of the desired high voltage output (e.g., the size of hold capacitor 150), or the voltage increment required to achieve the desired high voltage output. For example, the voltage increment can be determined from a measurement comparison to a threshold value, and the number of cycles needed to achieve the desired high voltage output can be computed based on the difference between the measured and target values. Alternatively, the measurement of a voltage at or below the threshold value can act as a trigger for a fixed number of operating cycles to be initiated.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A method for delivering charge to a primary circuit node, the method comprising:

generating a sequential charging pattern for at least a subset of a series-connected plurality of charge-pump stages connected between a supply voltage node and the primary circuit node;

initiating the sequential charging pattern one or more times at an initiation rate that is adjustable to be equal to or less frequent than a frequency of a given clock signal having a plurality of phases per clock cycle, wherein upon each initiation of the sequential charging pattern, charge starts propagating along the plurality of charge-pump stages according to the sequential charging pattern; and upon every phase of the given clock signal, activating one or more of a plurality of driving circuits in a sequence according to the sequential charging pattern, each of the plurality of driving circuits being individually associated with one of the plurality of charge-pump stages, wherein activating the plurality of driving circuits in a sequence drives charge between stages of the plurality of charge-pump stages;

wherein each of the plurality of driving circuits that is activated according to the sequential charging pattern is activated at a rate equal to the initiation rate such that only a subset of the plurality of driving circuits are activated during each clock cycle of the given clock signal.

2. The method of claim 1, wherein initiating the sequential charging pattern comprises initiating the sequential charging pattern one time for every N cycles of the given clock signal, wherein N is an adjustable integer value selected from a range of values greater than or equal to 1.

3. The method of claim 2, wherein the plurality of charge-pump stages comprises a number k of charge-pump stages; and wherein N is divisible into the number k of charge-pump stages.

4. The method of claim 2, wherein the plurality of charge-pump stages comprises a number k of charge-pump stages, wherein N is not divisible into the number k of charge-pump stages; and wherein the sequential charging pattern is either terminated partway through the charge pump or the sequential charging pattern is initiated a number of times such that it ends on a last of the charge-pump stages.

5. The method of claim 1, wherein activating the plurality of driving circuits comprises:

driving charge through one of the series-connected plurality of charge-pump stages; and repeatedly driving charge through a next sequential charge-pump stage through at least a subset of the series-connected plurality of charge-pump stages.

6. The method of claim 5, wherein driving charge through the one of the series-connected plurality of charge-pump stages is initiated based on a regulation signal; and wherein repeatedly driving charge through the next sequential charge-pump stage is performed until the regulation signal changes.

7. The method of claim 5, wherein the one of the series-connected plurality of charge-pump stages comprises a first of the series-connected plurality of charge-pump stages connected closest to the supply voltage node.

8. The method of claim 5, wherein the one of the series-connected plurality of charge-pump stages comprises any of the series-connected plurality of charge-pump stages connected between the supply voltage node and the primary circuit node.

9. The method of claim 8, wherein the next sequential one of the series-connected plurality of charge-pump stages comprises an adjacent one of the series-connected plurality of charge-pump stages that is connected relatively closer to the primary circuit node.

10. The method of claim 1, wherein delivering charge to a primary circuit node comprises charging a hold capacitor connected to the primary circuit node.

11. The method of claim 1 further comprising:

measuring a present charge state of the primary circuit node; and selectively controlling an initiation rate of the sequential charging pattern to charge the primary circuit node to a desired charge state within a predetermined time period, wherein the initiation rate of the sequential charging pattern is selected based on a difference between the present charge state and the desired charge state.

12. The method of claim 11, wherein measuring a present charge state of the hold capacitor comprises extrapolating the present charge state from a voltage measurement taken at one of the plurality of charge-pump stages.

13. The method of claim 1 further comprising selectively controlling an initiation rate of the sequential charging pattern to compensate for one or more of leakage or operation currents from the primary circuit node, wherein the primary circuit node is maintained at a desired charge state.

14. A charge pump comprising:

a series-connected plurality of charge-pump stages connected between a supply voltage node and a primary circuit node;

a separate driving circuit associated with each of the plurality of charge-pump stages;

at least one charging signal generator in communication with each driving circuit associated with each of the plurality of charge-pump stages; and a pattern generation device in communication with a clock signal generator and the at least one charging signal generator, the pattern generation device being configured to generate a patterned clock signal based on a two-phase clock signal supplied by the clock signal generator, the patterned clock signal comprising a selectively adjustable subset of cycles of the two-phase clock signal;

wherein the at least one charging signal generator is configured to selectively activate one or more of the driving circuits every phase of the two-phase clock signal to drive charge between stages of the plurality of charge-pump stages in a sequential charging pattern based on the patterned clock signal from the pattern generation device.

15. The charge pump of claim 14, wherein the at least one charging signal generator comprises one or more shift registers.

16. The charge pump of claim 15, wherein the one or more shift registers together comprise a number of output bits that is equal to a number of charge-pump stages.

17. The charge pump of claim 14, wherein the pattern generation device comprises one of a programmable counter or a programmable divider of $2^p$.

18. The charge pump of claim 14, further comprising a voltage measurement device configured to measure a present charge state of a hold capacitor connected to the primary circuit node.

19. The charge pump of claim 18, wherein the voltage measurement device is connected in communication with one of the plurality of charge-pump stages, and wherein the voltage measurement device is configured to extrapolate the present charge state of the hold capacitor from a voltage measurement taken at the one of the plurality of charge-pump stages.

20. A method for delivering charge to a primary circuit node, the method comprising:
   generating a sequential charging pattern for at least a subset of a series-connected plurality of charge-pump stages connected between a supply voltage node and the primary circuit node, wherein generating a sequential charging pattern comprises:
      supplying a two-phase clock signal to a pattern generation device; and
      generating a patterned clock signal based on the two-phase clock signal, the patterned clock signal comprising a selected subset of cycles of the two-phase clock signal; and
      transmitting the patterned clock signal to at least one charging signal generator connected in communication with the each of the plurality of charge-pump stages;
   initiating the sequential charging pattern one or more times at an initiation rate that is adjustable to be equal to or less frequent than the two-phase clock signal, wherein upon each initiation of the sequential charging pattern, one or more of a plurality of driving circuits are activated, each of the plurality of driving circuits being individually associated with one of the plurality of charge-pump stages; and
   upon every phase of the two-phase clock signal, activating a next one or more of the plurality of driving circuits in a sequence according to the sequential charging pattern, wherein activating the plurality of driving circuits in a sequence drives charge between stages of the plurality of charge-pump stages;
   wherein activating the plurality of driving circuits in a sequence comprises activating the plurality of driving circuits associated with the plurality of charge-pump stages according to the patterned clock signal.

21. The method of claim 20, wherein supplying a two-phase clock signal comprises supplying a non-overlapping clock signal.

22. The method of claim 20, wherein supplying a two-phase clock signal comprises supplying an overlapping clock signal.

23. The method of claim 20, wherein the pattern generation device comprises a decrementing programmable counter, wherein every time the decrementing programmable counter reaches zero, the decrementing programmable counter initiates the sequential charging pattern of the plurality of charge-pump stages and resets to an initial value.

* * * * *